United States Patent
Kaplin et al.

(10) Patent No.: US 7,618,742 B2
(45) Date of Patent: Nov. 17, 2009

(54) ELECTROCHEMICAL CELL WITH IMPROVED INTERNAL CONTACT

(75) Inventors: David A. Kaplin, Mayfield Heights, OH (US); James X. Wu, North Olmsted, OH (US)

(73) Assignee: Eveready Battery Co., Inc., St. Louis, MO (US)

( * ) Notice: Subject to any disclaimer, the term of this patent is extended or adjusted under 35 U.S.C. 154(b) by 857 days.

(21) Appl. No.: 11/045,900

(22) Filed: Jan. 28, 2005

(65) Prior Publication Data

US 2006/0172190 A1 Aug. 3, 2006

(51) Int. Cl.
*H01M 2/14* (2006.01)
*H01M 2/18* (2006.01)
(52) U.S. Cl. .................. 429/130; 429/129; 429/131
(58) Field of Classification Search .................. 429/130
See application file for complete search history.

(56) References Cited

U.S. PATENT DOCUMENTS

| | | | | |
|---|---|---|---|---|
| 3,245,837 | A | 4/1966 | Ikeda et al. | 136/134 |
| 4,554,227 | A | 11/1985 | Takagaki et al. | 429/178 |
| 4,963,445 | A | 10/1990 | Marple et al. | 429/94 |
| 4,963,446 | A | 10/1990 | Roels et al. | 429/94 |
| 5,021,306 | A | 6/1991 | Sauer et al. | 429/94 |
| 5,925,482 | A * | 7/1999 | Yamashita | 429/130 |
| 6,190,794 | B1 * | 2/2001 | Wyser | 429/94 |
| 6,451,473 | B1 | 9/2002 | Saito et al. | |
| 2002/0094478 | A1 | 7/2002 | Holland | 429/211 |
| 2003/0072993 | A1 * | 4/2003 | Kim et al. | 429/94 |
| 2004/0197647 | A1 | 10/2004 | Murashige et al. | |

FOREIGN PATENT DOCUMENTS

| | | |
|---|---|---|
| EP | 0422966 A | 4/1991 |
| EP | 1139463 A | 10/2001 |
| JP | 58-119154 A | 7/1983 |
| JP | 05121064 | 5/1993 |
| JP | 05-166539 * | 7/1993 |
| JP | 05-166539 A | 7/1993 |
| JP | 09035739 | 2/1997 |
| JP | 09330697 | 12/1997 |
| JP | 02289167 | 10/2002 |

* cited by examiner

*Primary Examiner*—Patrick Ryan
*Assistant Examiner*—Steven Scully
(74) *Attorney, Agent, or Firm*—Robert C. Baraona; Russell H. Toye, Jr.

(57) ABSTRACT

An electrochemical battery cell with an electrical lead for electrical contact between one of the cell's electrodes and the side of the cell container. A portion of the lead, disposed between the electrode assembly and the side wall of the container, includes an initially non-planar shape that is in a partially deformed, compressed configuration within the cell to bias the lead against the internal surface of the side wall of the container, thereby applying sufficient force to provide good electrical contact between the electrode and the container. The initially non-planar shape can include one or more V-shaped or arc-shaped grooves, and the grooves can be disposed parallel to a longitudinal axis of the electrode assembly. Also disclosed is a process for making such a cell.

12 Claims, 10 Drawing Sheets

ELECTROCHEMICAL CELL WITH IMPROVED INTERNAL CONTACT

BACKGROUND

This invention relates to electrochemical battery cells with strip-like electrodes and having a pressure contact between a lead from one of the electrodes and a side wall of the cell container.

Cells with adjacent positive and negative electrode strips can be used to provide good high rate discharge performance. Electrode assemblies containing such strips can include one or more pairs of flat, folded or spirally wound positive and negative electrodes. Cells can have housings including containers made from electrically conductive metals that are in electrical contact with one of the electrodes. In such cells the cell container can serve as or provide electrical contact to an external contact terminal.

Electrically conductive leads can be used for making electrical contact between electrodes and another cell component, such as the container or a cover closing a portion of the container. Leads can be in various forms and shapes, such as wires, strips and springs, and leads can be connected to containers or covers in various ways, including by fastening (e.g., welding) and by pressure.

Examples of cells in which an electrode lead is welded to an exposed edge or surface of an electrode current collector are found in U.S. Pat. No. 4,554,227, which is hereby incorporated by reference, and in unexamined Japanese patent publication numbers 05-121064 and 09-035739. In each of these the leads are electrically connected to external terminals by welding. In U.S. Pat. No. 4,554,227 the lead is bent to improve the strength of the welds to the exposed top edge of the electrode current collector.

Examples of cells in which pressure contact is used between a lead and an exposed portion of an electrode current collector at the core of the electrode assembly are found in U.S. Pat. Nos. 3,245,837 and 5,021,306, which are hereby incorporated by reference. In U.S. Pat. No. 3,245,837 the lead is an electrically conductive strip that is fastened to a cover plate and external terminal. In U.S. Pat. No. 5,021,306 the lead is a metal splint, and a leaf spring welded to the cap on the open end of the container makes pressure contact with the splint.

An example of a cell with leads that are bare portions of current collectors protruding from a plurality of electrodes is found in U.S. Patent Publication No. US 2002/0094478 A1, which is hereby incorporated by reference. The plurality of leads is bent and welded together, then fastened to a cell cover. The bends in the leads provide good weld strength.

An example of a cell with a lead extending from the bottom of an electrode assembly and welded to the bottom of the container is found in unexamined Japanese patent publication number 09-330697. A V-shaped groove is formed in a portion of the lead welded to the container to provide good weld strength.

Examples of cells with leads providing electrical contact between one electrode and the cell container and between the other electrode and a cover closing the container are found in U.S. Pat. Nos. 5,418,084 and 4,963,446, which are hereby incorporated by reference, as well as in FIGS. 1 and 2 herein. The cells are cylindrical cells with spirally wound electrode assemblies. As described in further detail below with reference to FIGS. 1 and 2, in each cell a spring provides electrical contact between the positive electrode and the cell cover, and a metal strip lead provides electrical contact between the negative electrode and the side wall of the container. The spring is fastened to the cell cover and makes pressure contact with the positive electrode current collector exposed at the top of the electrode assembly. The metal strip lead is fastened to the negative electrode and makes pressure contact with the inside surface of the container side wall. A reliable pressure contact is needed between the lead and the container under normal ranges of variability in manufacturing.

In a cell such as the cell in FIGS. 1 and 2, when made according to the prior art, the lead between the container side wall and the electrode assembly is held in pressure contact by a tight fit of the electrode assembly in the container. For reliable electrical contact, variability in the inside diameter of the container and the outside diameter of the electrode assembly must be small. One way of achieving a small variability in the electrode assembly outside diameter is to tightly control the thicknesses of the electrode strips. Another way is to vary the length of a strip of material that is wrapped around the external side surface of the electrode assembly to compensate for variations in thicknesses of the electrodes that can result in differences in diameter. This outer strip of material can be one or more strips of separator or a separate strip of overwrap material, as disclosed in U.S. Pat. No. 4,963,445, which is hereby incorporated by reference.

An object of the present invention is to provide reliable pressure contact between an electrode lead and the side wall of the cell container. Additional advantages of the invention can include, but are not limited to, improved contact reliability, increased tolerance of variability in manufacturing, reduced number of cell components, improved ease of manufacturing, reduced manufacturing scrap and reduced product cost.

SUMMARY

Accordingly, one aspect of the present invention is directed to an electrochemical battery cell comprising a housing, an electrode assembly and an electrolyte, wherein the electrode assembly comprises a negative electrode strip, a positive electrode strip and at least one separator strip disposed between the negative and positive electrodes; the housing comprises a container having at least one side wall and a bottom wall; the electrode assembly has an electrically nonconductive external side surface adjacent to the container side wall and a bottom adjacent to the container bottom wall; one of the negative and positive electrodes is in electrical contact with the container side wall through an electrical lead extending from the electrode assembly, and at least a portion of the lead is disposed between the electrode assembly side surface and the container side wall; the lead is maintained in physical contact with the container side wall by pressure only; and the portion of the lead between the electrode assembly side surface and the container side wall comprises a deformed initially non-planar shape that is biased against an internal surface of the container side wall.

Another aspect of the present invention is directed to an electrochemical battery cell comprising a housing, an electrode assembly and an electrolyte, wherein the electrode assembly comprises a negative electrode strip, a positive electrode strip and at least one separator strip disposed between the negative and positive electrodes; the housing comprises a container having at least one side wall and a bottom wall; the electrode assembly has an electrically nonconductive external side surface adjacent to the container side wall and a bottom adjacent to the container bottom wall; one of the negative and positive electrodes is in electrical contact with the container side wall through an electrical lead extending from the electrode assembly, and at least a portion of the lead is disposed between the electrode assembly side surface and the container side wall; the lead is maintained in physical contact with the container side wall by pressure only; and the portion of the lead between the electrode assembly side surface and the container side wall comprises two edges and a deformed initially grooved shape that is biased against an internal surface of the container side wall, with the groove disposed parallel to a longitudinal axis of the electrode assembly and the edges not pointed toward the electrode assembly side surface.

Yet another aspect of the present invention is directed to an electrochemical battery cell comprising a housing, an electrode assembly and an electrolyte, the cell being made by a process comprising the steps:

a. providing a negative electrode strip, a positive electrode strip and at least one separator strip;

b. providing an electrical lead comprising a conductive metal strip with a first end and a second end;

c. fastening the first end of the lead to one of the negative and positive electrodes;

d. combining the negative electrode, positive electrode and separator strips together into an electrode assembly comprising a bottom and at least one side surface such that the side surface is electrically nonconductive and the second end of the lead extends from the electrode assembly;

e. prior to inserting the electrode assembly into the container, forming at least a portion of the lead extending from the electrode assembly to create an initially non-planar shape;

f. positioning the portion of the lead having the non-planar shape adjacent to the electrically nonconductive side surface of the electrode assembly;

g. deforming the non-planar shape to facilitate insertion of the electrode assembly through an opening in the container;

h. inserting the electrode assembly through the opening into the container; and i. allowing the deformed non-planar shape of the lead to partially return toward the initially non-planar shape to apply sufficient force against the side wall of the container for electrical contact.

These and other features, advantages and objects of the present invention will be further understood and appreciated by those skilled in the art by reference to the following specification, claims and appended drawings.

DESCRIPTION

Figure 1:
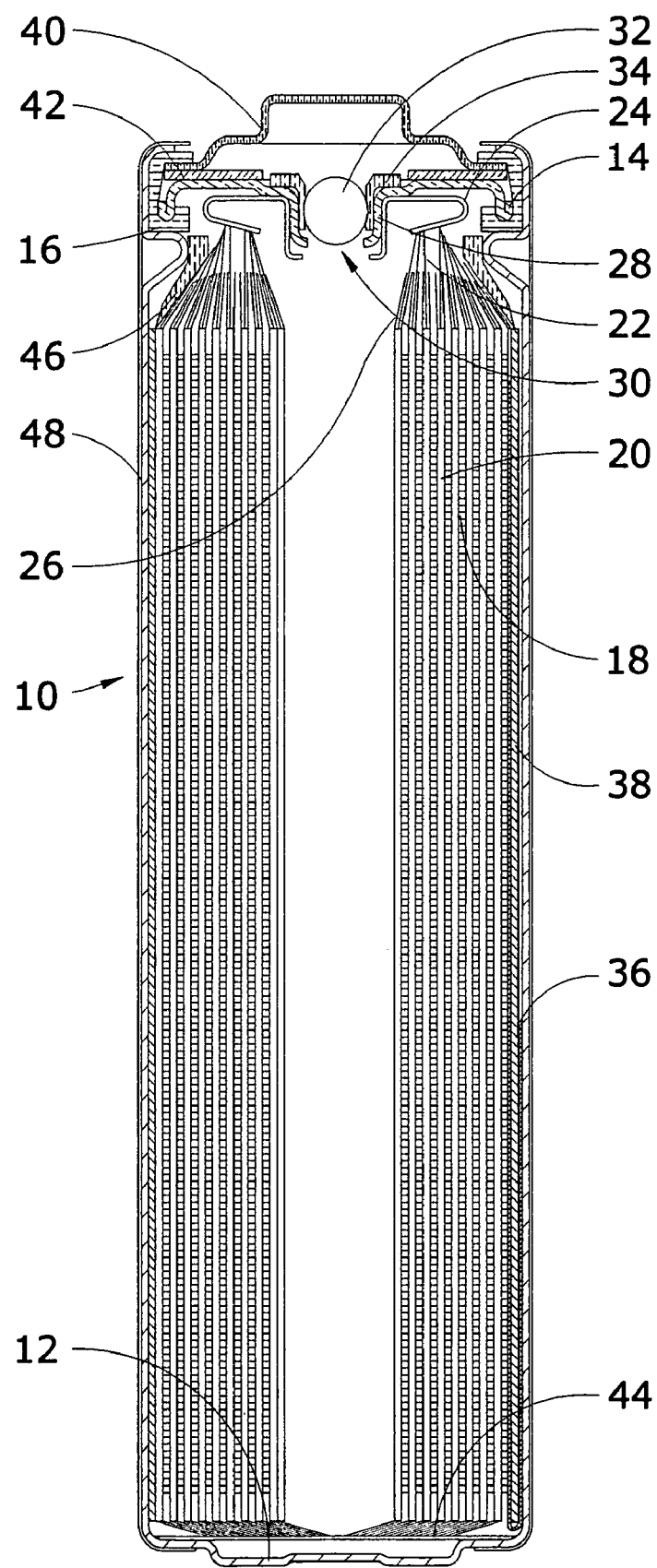
FIG. 1 is a longitudinal cross sectional view of an electrochemical battery cell with a lead disposed between the side of the container wall and the external surface of the container for making electrical contact between the container and a cell electrode.
Figure 2:
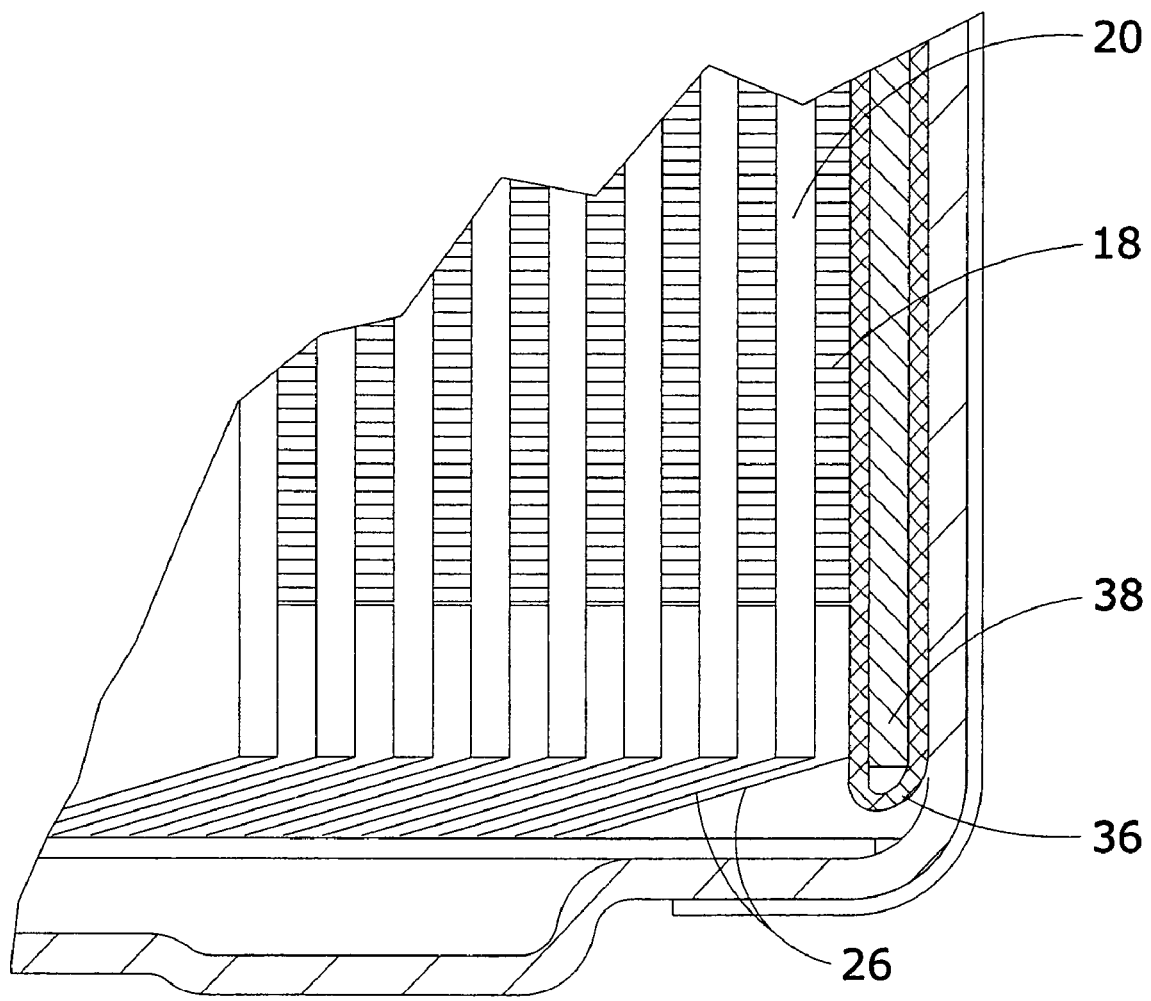
FIG. 2 is an enlarged view of a portion of the cell in FIG. 1 showing the location of the electrode lead contacting the container.

The invention will be better understood with reference to FIGS. 1 and 2. Cell 10 is an FR6 type cylindrical Li/FeS$_2$ battery cell. Cell 10 has a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36 (FIG. 2). The lead 36 is fastened to the anode 18, extends from the bottom of the electrode assembly, is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

Cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10.

Figure 3A:
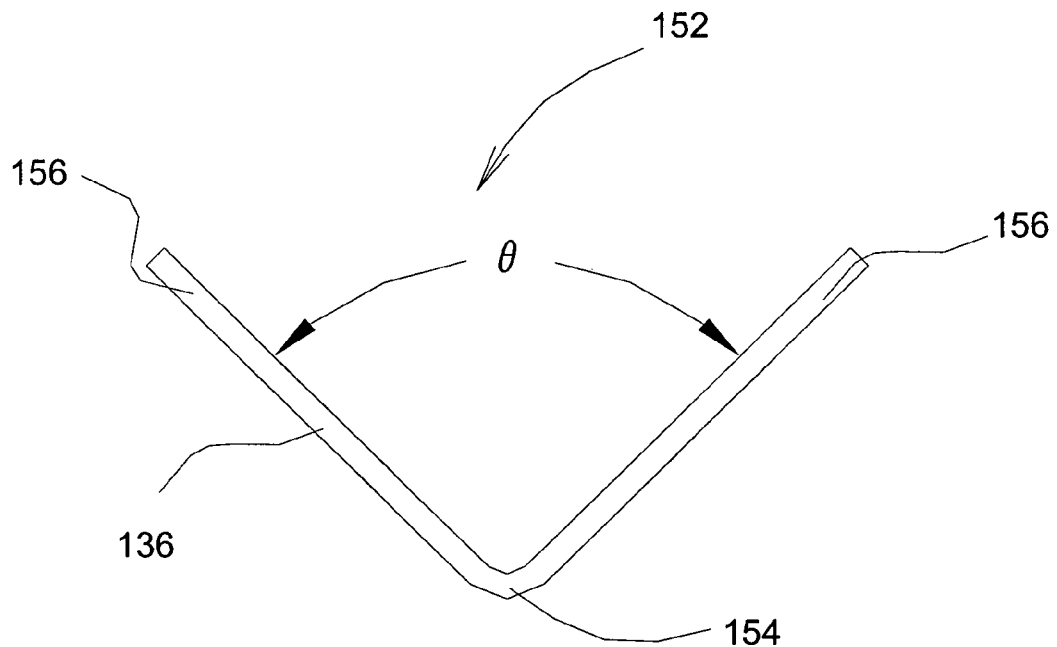
FIG. 3A is a transverse cross sectional view of the terminal portion of an electrode lead with a single V-shaped groove.
Figure 3B:
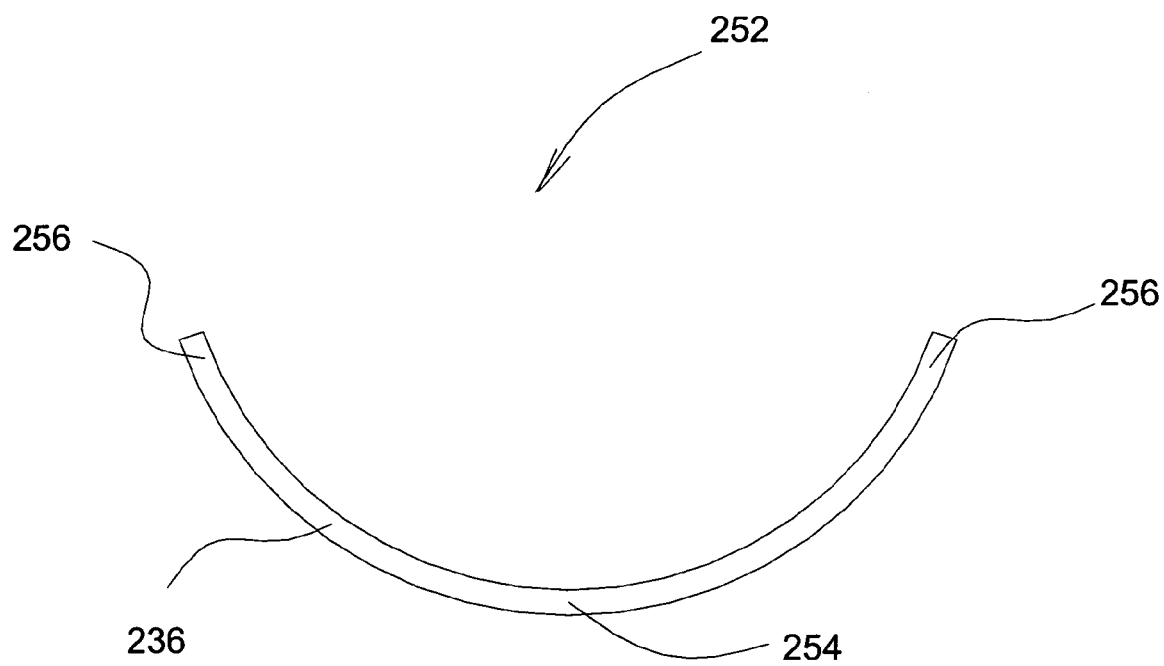
FIG. 3B is a transverse cross sectional view of the terminal portion of an electrode lead with a single arc-shaped groove.

In a cell according to the invention, the terminal portion of the electrode lead, disposed between the side of the electrode assembly and the side wall of the can, is initially non-planar. As used herein, initially non-planar means non-planar prior to insertion of the electrode assembly into the can. Before electrode assembly insertion, the terminal portion of the lead is formed to create a non-planar shape that can provide improved pressure contact with the side wall of the can. The non-planar shape can provide a spring-like characteristic in the terminal portion of the lead, resulting in the application of force by the terminal portion of the lead to bias the lead against the can side wall, thereby providing improved pressure contact for a given gap between the side of the electrode assembly and the side wall of the can and increasing the maximum possible gap for which good electrical contact can be maintained. A variety of non-planar shapes can be used, including shapes with cross sections having one or more V's, arcs, and the like and combinations thereof. Examples of leads with single V-shaped and arc-shaped grooves are shown in FIGS. 3A and 3B, respectively, in which the groove 152, 252 has a bottom 154, 254 and edges 156, 256 in the terminal portion of the lead 136, 236.

Figure 4A:
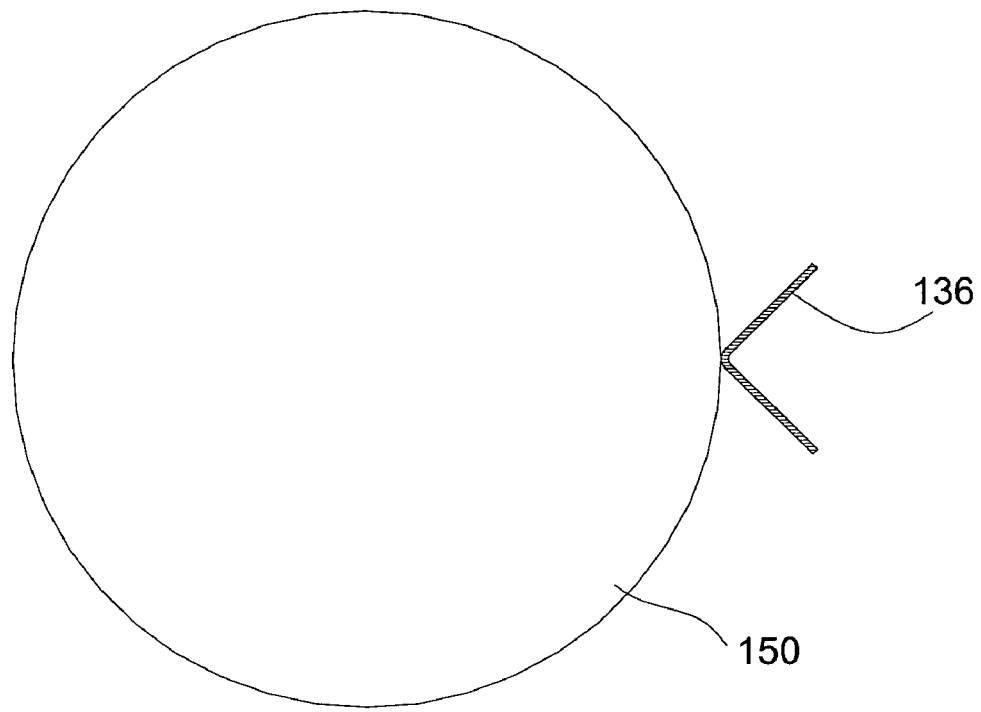
FIG. 4A is a cross sectional view, perpendicular to the longitudinal axis of the electrode assembly, of an electrode assembly with a V-shaped electrode lead.
Figure 4B:
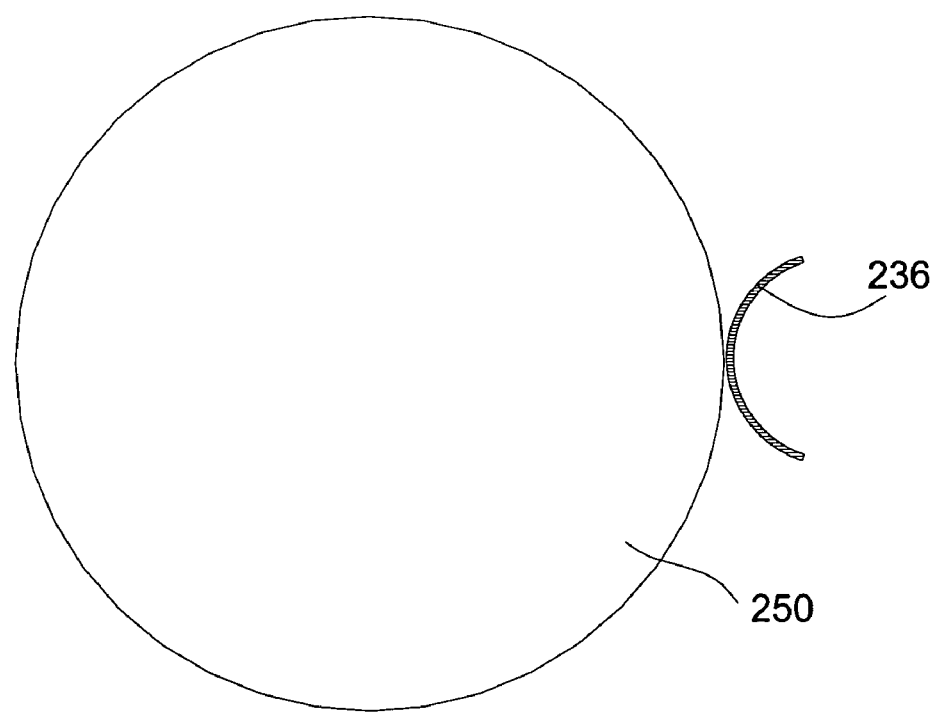
FIG. 4B is a cross sectional view, perpendicular to the longitudinal axis of the electrode assembly, of an electrode assembly with an arc-shaped electrode lead.
Figure 5A:
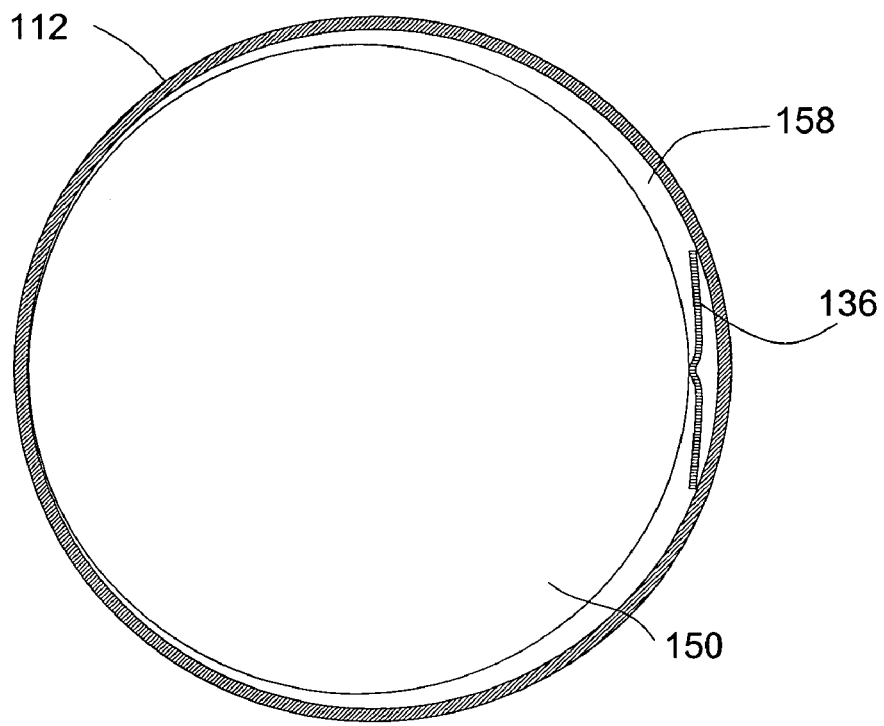
FIG. 5A is a cross sectional view of the electrode assembly and lead in FIG. 4A after the electrode assembly has been inserted into a can.
Figure 5B:
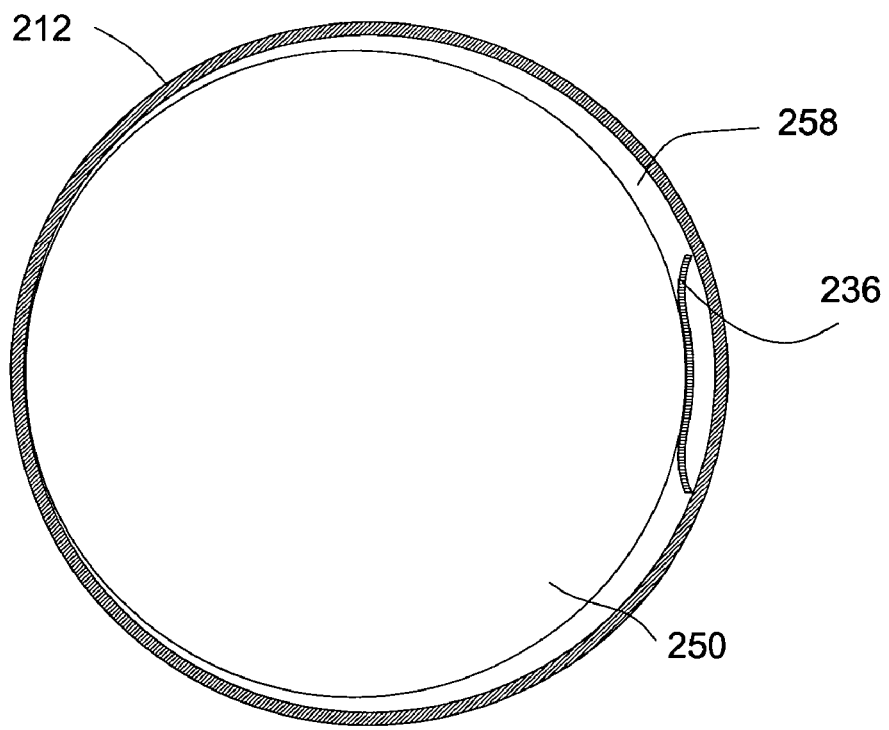
FIG. 5B is a cross sectional view of the electrode assembly and lead in FIG. 4B after the electrode assembly has been inserted into a can.

During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can. FIGS. 4A and 4B are cross-sectional shapes of electrode assemblies 150, 250 and the terminal portions of the leads 136, 236 (FIGS. 3A and 3B) after the terminal portions of the leads 136, 236 have been bent into position adjacent to the external side surfaces of the electrode assemblies 150, 250. FIGS. 5A and 5B show the electrode assemblies 150, 250 and terminal portions of the leads 136, 236 after insertion into cans 112, 212. The terminal portions of the leads 136, 236 are partially compressed compared to their pre-insertion shapes so they apply a spring force against the inner surfaces of the cans 112, 212, even if there are gaps 158, 258 between the side surfaces of the electrode assemblies 150, 250 and the side walls of the cans 112, 212.

The shape(s) formed in the terminal portion of the lead can be oriented in any way that will allow insertion of the electrode assembly into the can without damaging the electrode assembly, the lead or the can to the point that the cell's electrical or discharge characteristics will be undesirably affected. Orienting the shape in the terminal portion of the lead so that grooves are oriented to be parallel to the longitudinal axis of the electrode assembly can facilitate deformation of the lead prior to insertion into the can and spring-back of the lead after insertion without causing deleterious damage. In addition, by orienting the lead so the edges of the terminal portion of the lead do not point inward toward the electrode assembly, the risk of damage to the electrode assembly can be reduced. For example, a lead with a single groove can be oriented so the bottom of the groove faces inward, toward the electrode assembly, and the edges of the groove point outward, toward the can side wall.

The maximum gap, or difference between the outside diameter of the electrode assembly and the inside diameter of the can, that can be accommodated without loss of contact between the can and the lead can be calculated for a lead with a single V-shaped groove and for a lead with a single arc-shaped groove extending across the entire width of the lead using Equation 1 and Equation 2, respectively (assuming that the deformed terminal end of the lead would be able to fully spring back to its original shape if unconstrained by the electrode assembly and can).

Equation 1:

$$\left(\frac{W}{2}\right)\cdot\sin\left(\frac{180-\theta}{2}\right)+\left(\frac{ID-\sqrt{ID^2-(W^2/2)\cdot(1-\cos\theta)}}{2}\right)+t,$$

where: W=width of the flat strip from which the lead is made, t=lead strip thickness, θ=V leg angle (see FIG. 3A), ID=can inside diameter and 0°≦θ≦180°. This calculation assumes no radius where the legs of the V meet; if there is a radius, the maximum gap will be less than the calculated value.

Equation 2:

$$2R\cdot(1-\cos(W/(2R)))+\frac{ID-\sqrt{ID^2-(2R\sin(W/(2R)))^2}}{2}+t,$$

W=width of the flat strip from which the lead is made, t=lead strip thickness, R=arc radius, ID=can inside diameter and (W/R)≦π.

Computer modeling can be used to develop shapes for the terminal end of the lead and tooling for forming the lead that will insure physical contact between the lead and the can side wall and prevent damage to the lead during forming, taking into account considerations such as the properties and dimensions of the lead material and the dimensions of the electrode assembly and can. Computer modeling can also be used to design tooling for forming the terminal portion of the lead to the desired shape to avoid damage to the lead (e.g., tears, holes and wrinkles in the metal and abrasion of plating from the surface of the lead). Examples of commercially available software that can be used for computer modeling include ABAQUS (from Hibbit, Karlsson & Sorensen, Inc., Pawtucket, R.I., USA) and MARC K 7.3 (from MSC.Software, Los Angeles, Calif., USA).

The shape formed in the terminal portion of the lead can be advantageous in any of a number of ways. For example, compared to a lead with a planar terminal portion prior to insertion of the electrode assembly into the can, a shaped terminal portion can provide better spring characteristics, tolerate a greater difference in diameters between the side of the electrode assembly and the side of the can, and allow greater freedom of choice in lead material type and dimensions. Such advantages can result in improved cell characteristics, greater ease of cell manufacture and/or reduced cell manufacturing cost.

The cell container is often a metal can with a closed bottom such as the can in FIG. 1. The can material will depend in part of the active materials and electrolyte used in the cell. A common material type is steel. For example, the can may be made of steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins, Wilmington, Del., USA), polybutylene terephthalate (e.g., CELANEX® PBT, grade 1600A from Ticona-US, Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing is made from a thermoplastic material that is resistant to cold flow at high temperatures (e.g., 75° C.). The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler) is a preferred thermoplastic material.

The vent ball can be made from any suitable material that is stable in contact with the cell contents and provides the desired cell sealing and venting characteristic. Glasses or metals, such as stainless steel, can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA.

The anode may have a current collector, within or on the surface of the metallic lithium. As in the cell in FIG. 1, a separate current collector may not be needed, since lithium has a high electrical conductivity, but a current collector may be included, e.g., to maintain electrical continuity within the anode during discharge, as the lithium is consumed. When the anode includes a current collector, it may be made of copper because of its conductivity, but other conductive metals can be used as long as they are stable inside the cell.

An electrical lead can be made from a thin metal strip connecting the anode to one of the cell terminals (the can in the case of the FR6 cell shown in FIG. 1). The metal strip is often made from nickel or nickel plated steel and affixed directly to the lithium. This may be accomplished embedding an end of the lead within a portion of the anode or by simply pressing an end of the lead onto the surface of the lithium foil.

The cathode is in the form of a strip that comprises a current collector and a mixture that includes one or more electrochemically active materials, usually in particulate form. Iron disulfide ($FeS_2$) is a preferred active material. In a $Li/FeS_2$ cell the active material comprises greater than 50 weight percent $FeS_2$. The cathode can also contain one or more additional active materials, depending on the desired cell electrical and discharge characteristics. The additional active cathode material may be any suitable active cathode material. Examples include $Bi_2O_3$, $C_2F$, $CF_x$, $(CF)_n$, $CoS_2$, $CuO$, $CuS$, $FeS$, FeCuS$_2$, MnO$_2$, Pb$_2$Bi$_2$O$_5$ and S. More preferably the active material for a Li/FeS$_2$ cell cathode comprises at least 95 weight percent FeS$_2$, yet more preferably at least 99 weight percent FeS$_2$, and most preferably FeS$_2$ is the sole active cathode material. Battery grade FeS$_2$ having a purity level of at least 95 weight percent is available from American Minerals, Inc., Camden, N.J., USA; Chemetall GmbH, Vienna, Austria; and Kyanite Mining Corp., Dillwyn, Va., USA.

In addition to the active material, the cathode mixture contains other materials. A binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as the electrical conductivity of the active material and binder, the thickness of the mixture on the current collector and the current collector design. Small amounts of various additives may also be used to enhance cathode manufacturing and cell performance. The following are examples of active material mixture materials for Li/FeS$_2$ cell cathodes. Graphite: KS-6 and TIMREX® MX15 grades synthetic graphite from Timcal America, Westlake, Ohio, USA. Carbon black: Grade C55 acetylene black from Chevron Phillips Company LP, Houston, Tex., USA. Binder: ethylene/propylene copolymer (PEPP) made by Polymont Plastics Corp. (formerly Polysar, Inc.) and available from Harwick Standard Distribution Corp., Akron, Ohio, USA; non-ionic water soluble polyethylene oxide (PEO): POLYOX® from Dow Chemical Company, Midland, Mich., USA; and G1651 grade styrene-ethylene/butylenes-styrene (SEBS) block copolymer from Kraton Polymers, Houston, Tex. Additives: FLUO HT® micronized polytetrafluoroethylene (PTFE) manufactured by Micro Powders Inc., Tarrytown, N.Y., USA (commercially available from Dar-Tech Inc., Cleveland, Ohio, USA) and AEROSIL® 200 grade fumed silica from Degussa Corporation Pigment Group, Ridgefield, N.J.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

A preferred method of making FeS$_2$ cathodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit cathode material to the desired length. It is desirable to use cathode materials with small particle sizes to minimize the risk of puncturing the separator. For example, FeS$_2$ is preferably sieved through 230 mesh (62 µm) screen before use.

The cathode is electrically connected to the positive terminal of the cell. This may be accomplished with an electrical lead, often in the form of a thin metal strip or a spring, as shown in FIG. 1. The lead is often made from nickel plated stainless steel.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 µm thick, and more preferably no more than 22 µm thick, such as 20 µm or 16 µm. A high tensile stress is desirable, preferably at least 800, more preferably at least 1000 kilograms of force per square centimeter (kgf/cm$^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 µm to 0.40 µm, more preferably no greater than 0.20 µm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in U.S. patent application Ser. No. 10/719,425, filed on Nov. 21, 2003, which is hereby incorporated by reference.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness.

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided when the outermost electrode is the same electrode that is intended to be in electrical contact with the can.

Rather than being spirally wound, the electrode assembly may be formed by folding the electrode and separator strips together. The strips may be aligned along their lengths and then folded in an accordion fashion, or the anode and one electrode strip may be laid perpendicular to the cathode and another electrode strip and the electrodes alternately folded one across the other (orthogonally oriented), in both cases forming a stack of alternating anode and cathode layers.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the anode is adjacent the majority of the total area of the major surfaces of the cathode through the separator, and the outermost portions of the electrode major surfaces are adjacent to the side wall of the container. In this way, expansion of the electrode assembly due to an increase in the combined thicknesses of the anode and cathode is constrained by the container side wall(s).

A nonaqueous electrolyte, containing water only in very small quantities as a contaminant (e.g., no more than about 500 parts per million by weight, depending on the electrolyte salt being used), is used in the battery cell of the invention. Any nonaqueous electrolyte suitable for use with lithium and active cathode material may be used. The electrolyte contains one or more electrolyte salts dissolved in an organic solvent. For a $Li/FeS_2$ cell examples of suitable salts include lithium bromide, lithium perchlorate, lithium hexafluorophosphate, potassium hexafluorophosphate, lithium hexafluoroarsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. Suitable ethers include, but are not limited to acyclic ethers such as 1,2-dimethoxyethane, 1,2-diethoxyethane, di(methoxyethyl) ether, triglyme, tetraglyme and diethyl ether; and cyclic ethers such as 1,3-dioxolane, tetrahydrofuran, 2-methyl tetrahydrofuran and 3-methyl-2-oxazolidinone.

Specific anode, cathode and electrolyte compositions and amounts can be adjusted to provide the desired cell manufacturing, performance and storage characteristics, as disclosed in U.S. patent application Ser. No. 10/719,425, which is referenced above.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

The above description is particularly relevant to cylindrical $Li/FeS_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs. Other cell types in which the invention can be used include primary and rechargeable aqueous alkaline cells, such as zinc/manganese dioxide, zinc/nickel oxyhydroxide, nickel/cadmium and nickel/metal hydride cells, as well as primary and rechargeable nonaqueous cells, such as lithium/manganese dioxide and lithium ion cells. The electrode assembly configuration can also vary. For example, it can have spirally wound electrodes, as described above, folded electrodes, or stacks of strips (e.g., flat plates). The cell shape can also vary, to include cylindrical and prismatic shapes, for example.

Features of the invention and its advantages are further illustrated in the following examples.

EXAMPLE 1

Computer modeling was used to evaluate several negative electrode lead designs suitable for use in FR6 and FR03 cells with electrode assemblies similar to that illustrated in FIG. 1. The model was used to determine the spring force that could be exerted by the terminal end of a lead similar to the negative electrode lead in FIGS. 1 and 2. The spring force determined should approximate the amount of force exerted by the terminal portion of the lead against the inside surface of the side wall of the can.

The model used the following material properties for 0.051 mm (0.002 inch) thick nickel plated, cold rolled steel strip for the leads: Young's modulus=$2.07 \times 10^8$ Pa ($3.00 \times 10^7$ lb./in$^2$), Poisson's ratio=0.285 and initial yield strength=251,000 Pa (36,400 lb./in$^2$).

Three different shapes were evaluated for the terminal portion of the lead (the portion adjacent to the external surface of the electrode assembly, above the bend around the bottom of the electrode assembly, prior to insertion of the electrode assembly into the can): flat, V-shaped (FIG. 4A) and arc-shaped (FIG. 4B), with the grooves of the V- and arc-shaped leads located longitudinally along the centers of the terminal portions of the strips so that the grooves would be disposed parallel to the longitudinal axes of the cells after insertion of the electrode assemblies into the cans.

Figure 6A:
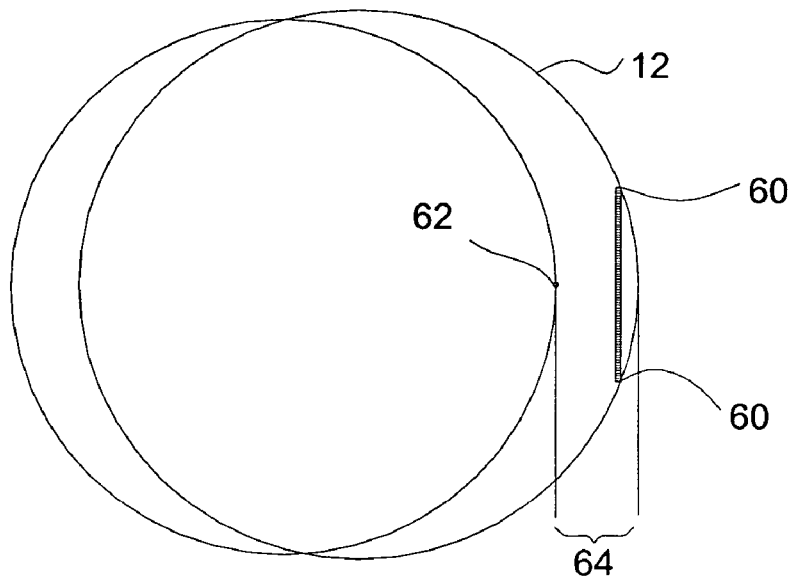
FIG. 6A is a cross sectional view of an electrode assembly, flat electrode lead and can showing their starting positions in a model used to determine spring force of the lead against the can.
Figure 6B:
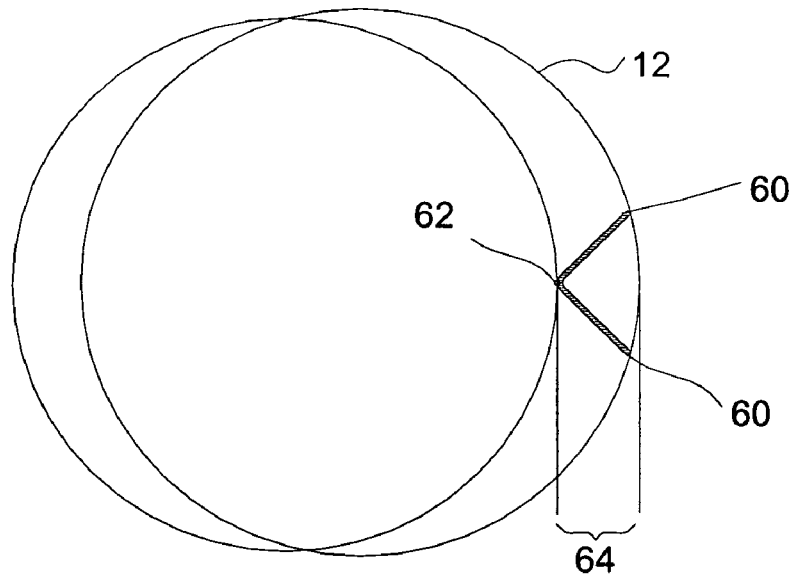
FIG. 6B is a cross sectional view of an electrode assembly, V-shaped electrode lead and can showing their starting positions in a model used to determine spring force of the lead against the can.
Figure 6C:
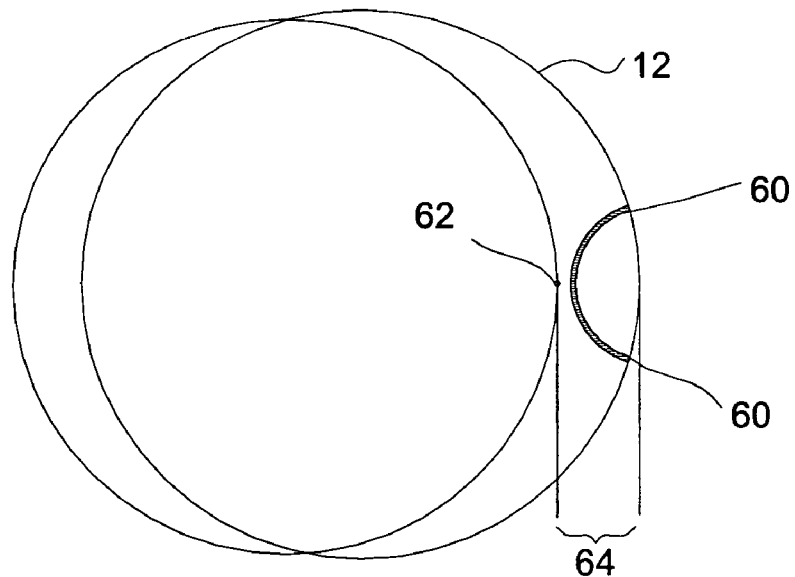
FIG. 6C is a cross sectional view of an electrode assembly, arc-shaped electrode lead and can showing their starting positions in a model used to determine spring force of the lead against the can.

In the model a cross section of the outside diameter of the electrode assembly and the terminal portion of the lead were superimposed over a cross section of the inside diameter of the can, using the initial lead shape and dimensions. An electrode assembly diameter of 12.90 mm (0.508 inch), a can inside diameter of 13.44 mm (0.529 inch), and a lead strip width of 4.75 mm (0.187 inch) were used in the FR6 cell evaluations; an electrode assembly diameter of 9.25 mm (0.364 inch), a can inside diameter of 9.70 mm (0.382 inch) and a lead strip width of 3.18 mm (0.125 inch) were used in the FR03 cell evaluations. For each cell size the starting positions of the electrode assembly and lead relative to the can were the same in each case and were established based on a lead initially formed into a V shape with a leg angle of 90 degrees, as shown in FIG. 6B (not to scale). The edges 60 of the lead were placed in contact with the can 12, and the electrode assembly was placed in contact with the base of the V at point 62. In the starting positions for each of the other cases evaluated, the edges 60 of the leads were placed in contact with the can 12 and the distance 64 between point 62 on the electrode assembly, through the center of the lead, to the can 12 was 1.88 mm (0.074 inch) for the FR6 cells and 1.24 mm (0.049 inch) for the FR03 cells. FIGS. 6A and 6C show the starting positions for FR6 cells with flat and arc-shaped leads, respectively, made from the same material as the V-shaped lead in FIG. 6B. Because the distance 64 was held constant, there is a gap between the lead and the electrode assembly in FIGS. 6A and 6C. In the model the position of the electrode assembly was moved to the right (FIGS. 6A-6C), reducing the distance 64, and the spring force of the lead against the can was determined as a function of the displacement to the right of point 62. In cases where there was a gap between point 62 and the lead, there was no spring force until the electrode was displaced sufficiently to contact and begin to push against the lead.

The results of the modeling are shown in FIGS. 7 through 14, which show spring force of the lead against the can (g/cm of length of the shaped portion of the lead) as a function of displacement of the electrode assembly (mm) from the starting point; Table 1 summarizes the cell type and lead shape represented in each of the drawings.

TABLE 1

| FIG. | Cell Type | Lead Shape |
|---|---|---|
| 7 | FR6 | Flat |
| 8 | FR6 | V-shaped, 90° leg angle |
| 9 | FR6 | Arc-shaped, 1.78 mm (0.070 inch) arc radius |
| 10 | FR6 | Arc-shaped, 1.91 mm (0.075 inch) arc radius |
| 11 | FR6 | Arc-shaped, 2.29 mm (0.090 inch) arc radius |
| 12 | FR03 | Flat |
| 13 | FR03 | V-shaped, 90° leg angle |
| 14 | FR03 | Arc-shaped, 1.40 mm (0.055 inch) arc radius |

The graphs in FIGS. 7-14 show the changes in spring force as the electrode assemblies are displaced to the right. The amount of displacement from the starting position (FIGS. 6A-6C) that places the left side of the electrode assembly (opposite point 62) against the inside left surface of the can for FR6 cells with a 12.90 mm diameter electrode assembly and FR03 cells with a 9.25 mm electrode assembly is indicated by line E. This corresponds to the position of the electrode assembly after insertion into the can when the electrode assembly is as far to the left as possible. For electrode assemblies with smaller or larger diameters, line E would be shifted left or right, respectively. The amount of displacement that places point 62 being against the inside right surface of the can is indicated by line F. In those cases where there is no gap between the lead and the electrode assembly in the starting position (FIGS. 8 and 13), the spring force begins to increase immediately with displacement of the electrode assembly to the right and a corresponding compression of the lead (deformation of the initial lead shape). In the other cases the spring force does not begin to rise above zero until there is no gap remaining. Points A1, B1, C1 and D1 show the spring force for incremental displacements of 0.127 mm (0.005 inch) for FR6 cells and 0.102 mm (0.004 inch) for FR03 cells. Points A2, B2, C2 and D2 show the changes in spring force if the electrode assembly is displaced back to the left (0.127 mm (0.005 inch) for FR6 cells and 0.102 mm (0.004 inch) for FR03 cells) after being initially displaced to the right to points A1, B1, C1 and D1, respectively. This corresponds to what would happen during insertion of the electrode assembly into the can, for example, if the lead is over-compressed (deformed more than the minimum necessary for the electrode assembly to fit within the inside diameter of the can) and then allowed to spring back against the can. The spring force is lower because of partial permanent deformation of the lead, due to the yield strength of the lead being exceeded in parts of the lead. In general, for a given amount of displacement of the electrode assembly, the V- and arc-shaped leads provide more spring force than a flat lead.

Figure 7:
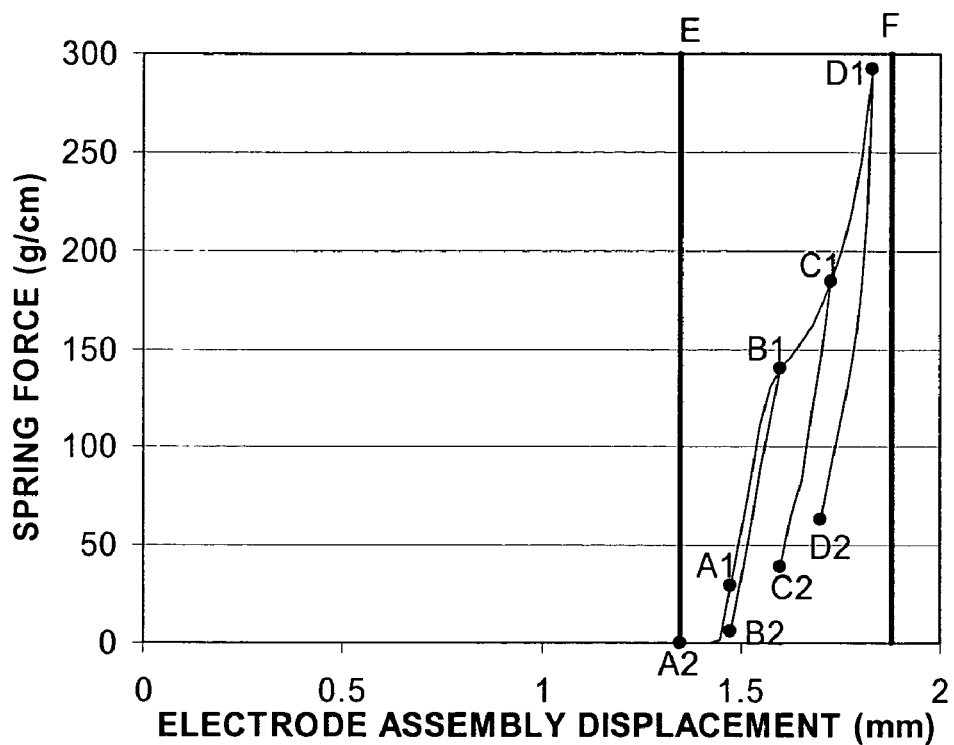
FIG. 7 is a graph, generated by a computer model, showing spring force as a function of electrode assembly displacement, for a 0.051 mm thick by 4.75 mm wide flat electrode lead.

In FIG. 7 (an FR6 cell with a flat lead), the spring force is zero at the starting point and until the electrode assembly is displaced more than 1.42 mm (0.056 inch) to the right. Because the spring force does not rise above zero until the electrode assembly is displaced beyond line E, there is no spring force between the lead and the can for an electrode assembly diameter of 12.90 mm or less. In other words, with an electrode assembly diameter of 12.90 mm, there is no spring force between the lead and the can. An additional displacement of 0.076 mm (0.003 in), corresponding to an electrode assembly diameter greater than 12.98 mm (0.511 inch) is required.

Figure 8:
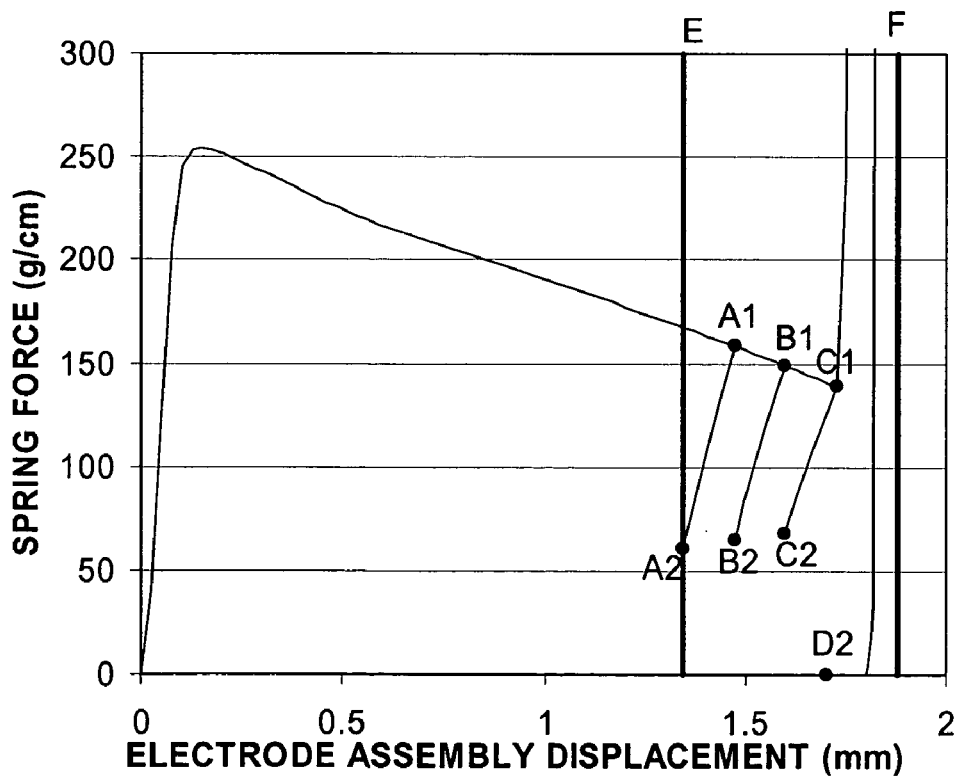
FIG. 8 is a graph, generated by a computer model, showing spring force as a function of electrode assembly displacement, for a V-shaped electrode lead with a leg angle of 90 degrees made from a strip of 0.051 mm thick by 4.75 mm wide metal strip.

In FIG. 8 (an FR6 cell with a 90 degree V-shaped lead), the spring force begins to rise as soon as displacement of the electrode assembly to the right begins. When the electrode assembly is displaced far enough that the left side of the electrode assembly is even with the inside left surface of the can, the spring force is 167 g/cm (corresponding to the intersection of the graph with line E. This means that in a cell with an electrode assembly diameter of 12.90 there will be spring force between the lead and the can, unless the lead is over-compressed too much. Excessive overcompression can result with a displacement beyond point C1, to where there are multiple points of contact between the deformed lead and the can and the spring force rises rapidly (off the graph), until the yield strength of the lead material is exceeded and the spring force drops to zero after only a small amount of springback. FIG. 8 shows that an electrode assembly diameter as small as about 11.55 mm (1.35 mm smaller than the minimum electrode diameter indicated in FIG. 7) can be used in a cell with a can inside diameter of 13.44 mm and the lead used in this evaluation.

Figure 9:
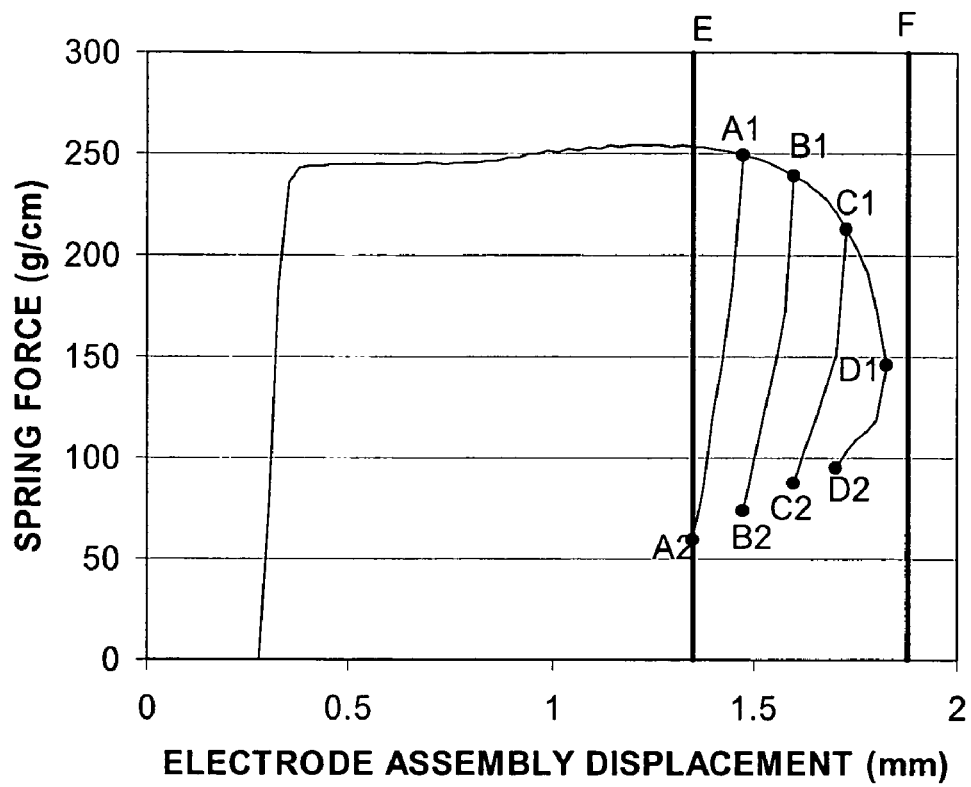
FIG. 9 is a graph, generated by a computer model, showing spring force as a function of electrode assembly displacement, for an arc-shaped electrode lead with an arc radius of 1.78 mm made from a strip of 0.051 mm thick by 4.75 mm wide metal strip.

In FIG. 9 (an FR6 cell with a 1.78 mm radius arc-shaped lead), there is a small gap between the electrode assembly and the lead at the starting point of the model, but the spring force is above zero at a displacement corresponding to a 12.90 mm diameter electrode assembly positioned against the inside left surface of the can. Line E can be shifted left by as much as 1.07 mm (0.042 inch) and still have a spring force greater than zero, so a smaller diameter electrode assembly (greater than 11.83 mm) can be used with this lead.

Figure 10:
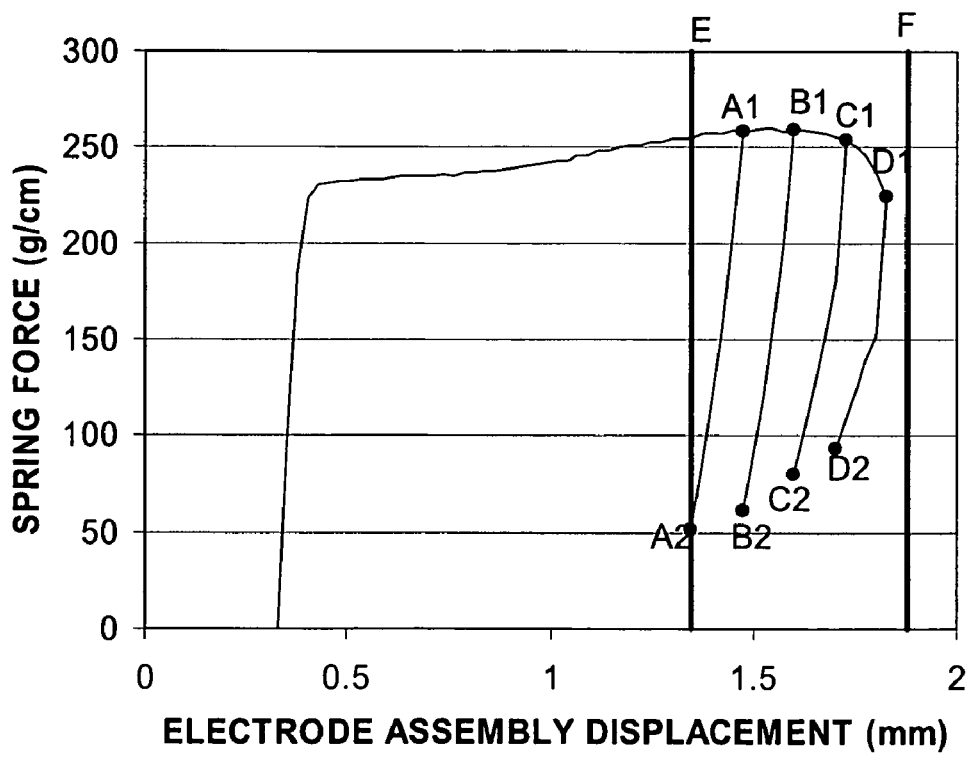
FIG. 10 is a graph, generated by a computer model, showing spring force as a function of electrode assembly displacement, for an arc-shaped electrode lead with an arc radius of 1.91 mm made from a strip of 0.051 mm thick by 4.75 mm wide metal strip.

The graph in FIG. 10 is similar to that in FIG. 9. Because points A1, B1, C1 and D1 are generally higher than the corresponding points in FIG. 9, spring forces should be higher with a 1.91 mm vs. 1.78 mm arc radius if there is no overcompression of the lead during insertion of the electrode assembly into the can. The minimum electrode assembly that can be used with this lead design is only slightly larger that determined from FIG. 9.

Figure 11:
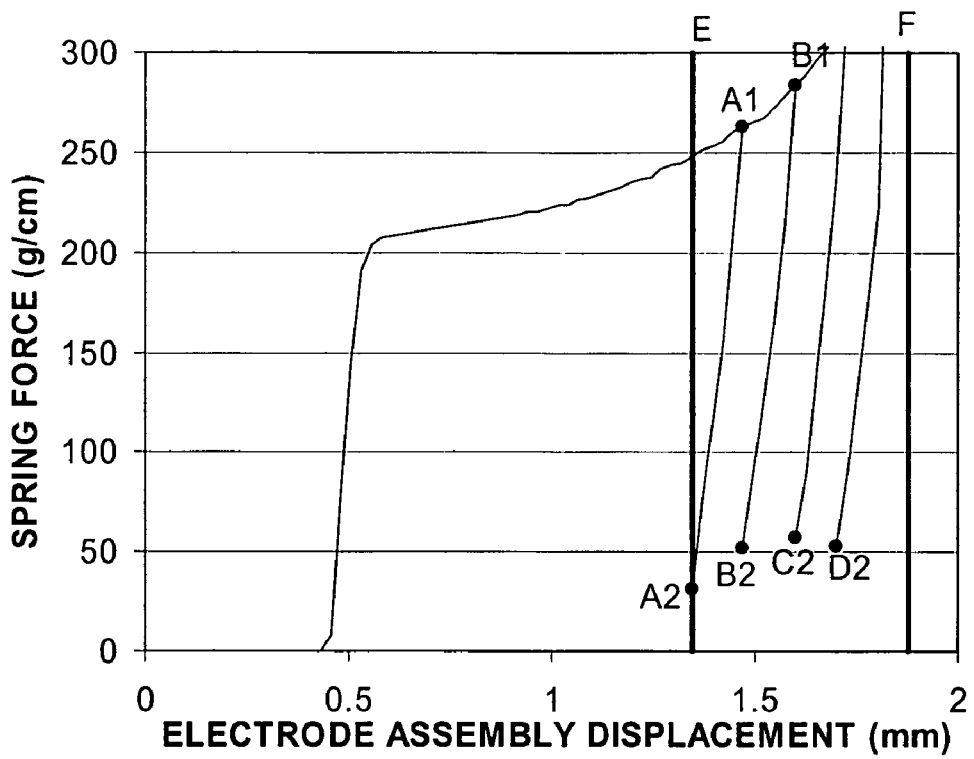
FIG. 11 is a graph, generated by a computer model, showing spring force as a function of electrode assembly displacement, for an arc-shaped electrode lead with an arc radius of 2.29 mm made from a strip of 0.051 mm thick by 4.75 mm wide metal strip.

The graph in FIG. 11 is similar to those in FIGS. 9 and 10. A comparison shows that a 2.29 mm arc radius results in higher spring forces for displacements beyond point B1 (point D1 is above the maximum spring force shown in FIG. 11), but there is somewhat more loss in spring force that results from overcompression, and the minimum electrode assembly diameter that can be used is slightly larger than those for leads with 1.91 mm and 1.78 mm arc radii.

Figure 12:
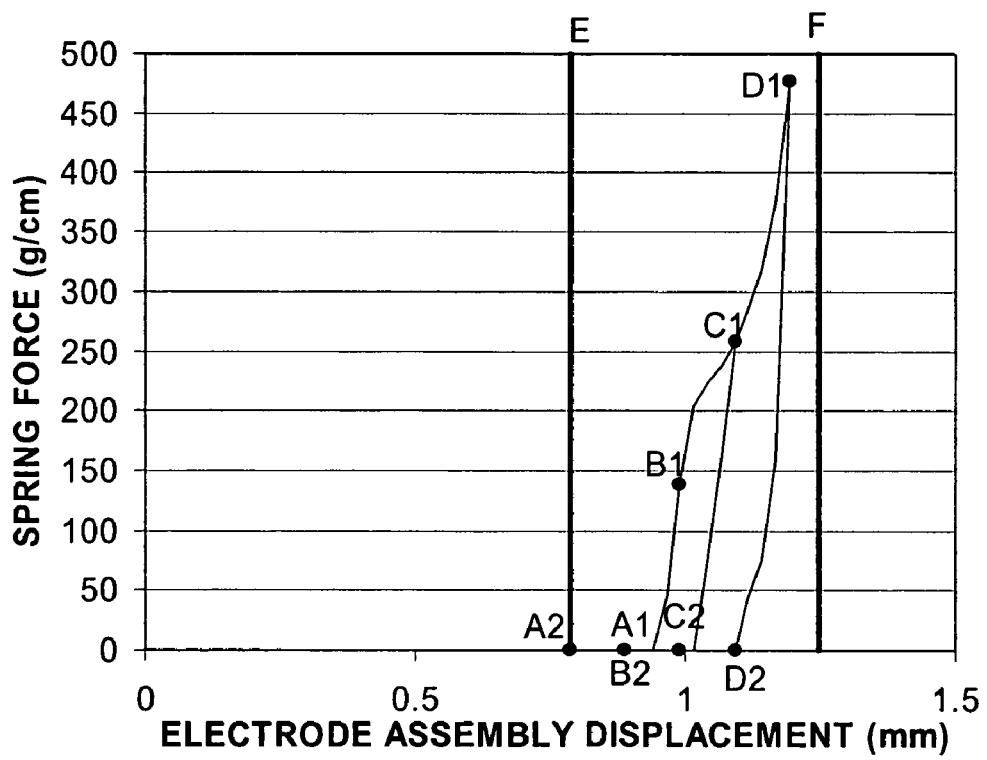
FIG. 12 is a graph, generated by a computer model, spring force as a function of electrode assembly displacement, for a 0.051 mm thick by 3.175 mm wide flat electrode lead.
Figure 13:
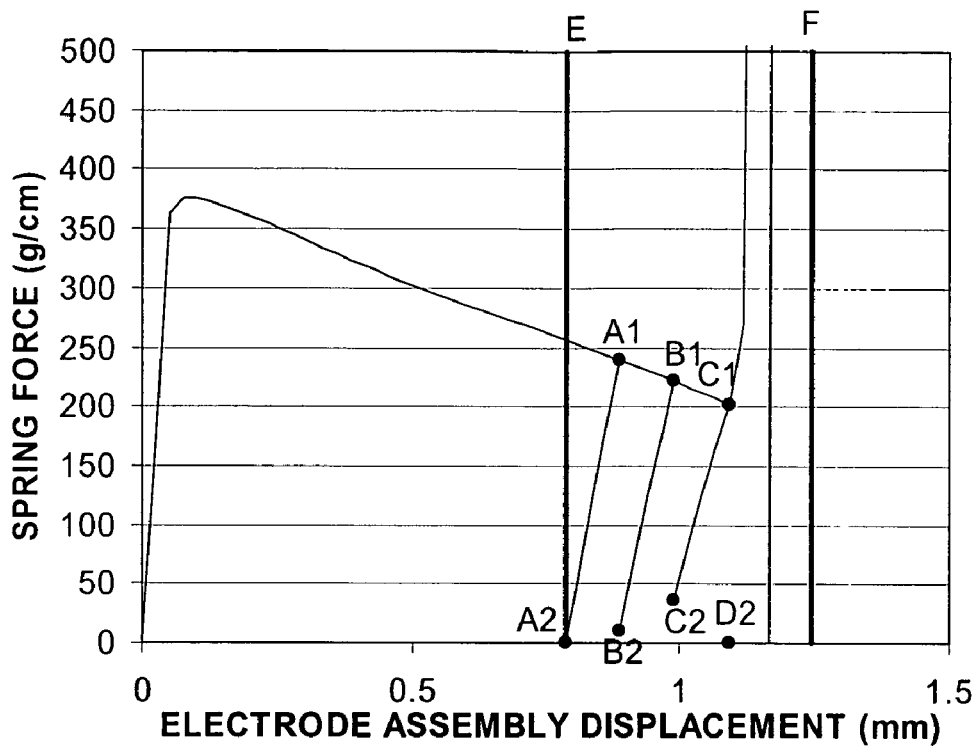
FIG. 13 is a graph, generated by a computer model, showing spring force as a function of electrode assembly displacement, for a V-shaped electrode lead with a leg angle of 90 degrees made from a strip of 0.051 mm wide thick by 3.175 mm wide metal strip.
Figure 14:
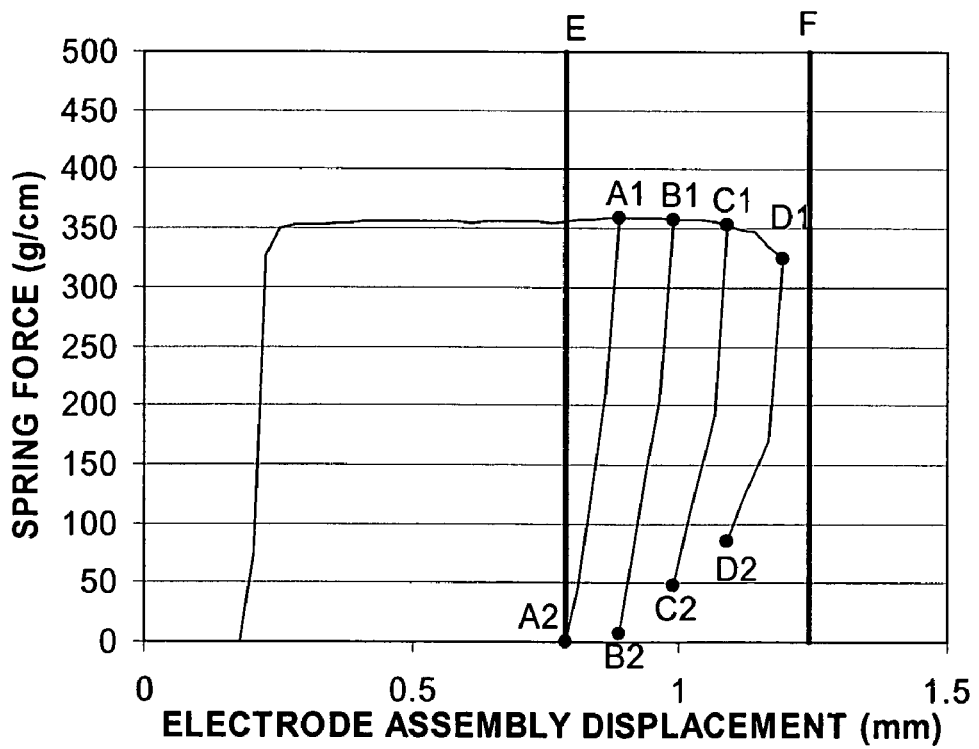
FIG. 14 is a graph, generated by a computer model, showing spring force as a function of electrode assembly displacement, for an arc-shaped electrode lead with an arc radius of 1.40 mm made from a strip of 0.051 mm thick by 3.175 mm wide metal strip.

The trends shown for FR03 cells in FIGS. 12, 13 and 14 are similar to those shown in FIGS. 7-11. Too much compression of the V-shaped lead can result in fatigue of the lead and loss of spring force. The minimum electrode diameter that can be used with the flat electrode lead represented in FIG. 12 is about 9.40 mm (0.370 inch), the minimum with the 1.40 mm radius arc-shaped lead represented in FIG. 14 is about 8.64 mm (0.340 inch), and the minimum with the 90 degree V-shaped lead represented in FIG. 13 is about 8.46 mm (0.333 inch).

EXAMPLE 2

Ten lots of FR6 cells, similar to cell 10 in FIGS. 1 and 2, were made to evaluate cell characteristics and performance. Each cell in Lots 1 and 2 had a 0.0254 mm (0.001 inch) thick strip of polyethylene film wrapped around the electrode assembly circumference. The average electrode assembly outside diameter (including the strip of polyethylene film was 13.06 mm (0.514 inch). Each cell in Lots 3-10 had no outer wrap of polyethylene film, and the average outside diameter of the electrode assembly was 12.95 mm (0.510 inch). In all lots the average inside diameter of the can was 13.41 mm (0.528 inch). In all lots the negative electrode lead was made from a thin strip of conductive metal 4.75 mm (0.187 inch) wide, cut to a length of 55.9 mm (2.20 inch). One end of the lead was attached to the lithium negative electrode near its outer end, so that the terminal end of the lead protruded from the bottom end of the assembled electrode assembly, where it was bent outward and then upward so the terminal portion of the lead was parallel to the longitudinal axis and adjacent to the external side surface of the electrode assembly, as shown in FIG. 2.

The negative electrode leads were different in each of the lots, as shown in Table 2. The non-planar leads had either a single V- or arc-shaped groove that was parallel to the longitudinal axis of the electrode assembly when the terminal end was bent along the side of the electrode assembly. The V leg angles, arc lengths and arc radii shown in Table 2 were dimensions of tooling used to make the shapes, and there was some deviation and variability in the actual formed leads. The grooves were approximately 12.7 mm (0.50 inch) long, extending from the terminal ends of the leads, with a transition zone from the V- or arc-shaped section to a planar section.

Sample cells from each lot were tested for open circuit voltage, AC impedance and amperage before and after storage for 60 days at 60° C. Sample cells from each lot were also tested on a variety of discharge, physical abuse and electrical abuse tests. There were no substantial differences, beyond expected variability, among the lots.

TABLE 2

| Lot | Lead Material | Lead Shape |
|---|---|---|
| 1 | Nickel plated cold rolled steel, 0.051 mm (0.002 inch) thick | flat |
| 2 | Nickel plated cold rolled steel, 0.051 mm (0.002 inch) thick | V-shaped groove, 90 degree leg angle |
| 3 | Nickel plated cold rolled steel, 0.051 mm (0.002 inch) thick | arc-shaped groove, 90° arc, 1.91 mm (0.075 inch) radius |
| 4 | Nickel, 0.076 mm (0.003 inch) thick | V-shaped groove, 90 degree leg angle |
| 5 | Nickel, 0.076 mm (0.003 inch) thick | arc-shaped groove, 90° arc, 1.91 mm (0.075 inch) radius |
| 6 | Nickel plated cold rolled steel, 0.051 mm (0.002 inch) thick | flat |
| 7 | Nickel plated cold rolled steel, 0.051 mm (0.002 inch) thick | V-shaped groove, 73 degree leg angle |
| 8 | Nickel plated cold rolled steel, 0.051 mm (0.002 inch) thick | arc-shaped groove, 90° arc, 1.50 mm (0.059 inch) radius |
| 9 | Copper-nickel alloy (Olin Brass Alloy 7025), 0.051 mm (0.002 inch) thick | V-shaped groove, 73 degree leg angle |
| 10 | Copper-nickel alloy (Olin Brass Alloy 7025), 0.051 mm (0.002 inch) thick | arc-shaped groove, 90° arc, 1.50 mm (0.059 inch) radius |

It will be understood by those who practice the invention and those skilled in the art that various modifications and improvements may be made to the invention without departing from the spirit of the disclose concept. The scope of protection afforded is to be determined by the claims and by the breadth of interpretation allowed by law.

The invention claimed is:

1. An electrochemical cell comprising:
   a cylindrical container having an inside diameter, at least one side wall and a bottom wall;
   a cylindrical electrode assembly having a negative electrode strip, a positive electrode strip, at least one separator strip disposed between the negative and positive electrodes, said electrode assembly having a bottom and an outside diameter defined by a nonconductive external side surface adjacent to the sidewall of the container;
   an electrolyte;
   wherein either the negative or the positive electrode is in electrical contact with the container side wall through an electrical lead extending from the electrode assembly, and at least a portion of the lead is disposed between the electrode assembly side surface and the container side wall;
   wherein the lead is in physical contact with the container side wall by pressure only;
   wherein the portion of the lead between the electrode assembly side surface and the container side wall comprises a groove disposed parallel to a longitudinal axis of the electrode assembly; and
   wherein the maximum difference between the container inside diameter and the electrode assembly diameter is defined by one equation selected from the group consisting of:

$$2R \cdot (1 - \cos(W/(2R))) + \frac{ID - \sqrt{ID^2 - (2R\sin(W/(2R)))^2}}{2} + t, \quad \text{i)}$$

wherein W is the width of the lead measured along a surface of the lead, t is the material thickness of the lead, R is the radius of an arc formed between two longitudinal edges of the lead, ID is the inside diameter of the container, and $(W/R) \leq \pi$; and $$\left(\frac{W}{2}\right) \cdot \sin\left(\frac{180 - \theta}{2}\right) + \left(\frac{ID - \sqrt{ID^2 - (W^2/2) \cdot (1 - \cos\theta)}}{2}\right) + t, \quad \text{ii)}$$

wherein W is the width of the lead measured along a surface of the lead, t is the material thickness of the lead, θ is an angle between 0 and 180 degrees defined by two longitudinal edges of the lead, and ID is the inside diameter of the can.

2. The cell according to claim 1, wherein the electrode assembly further comprises a strip of electrically insulating material covering at least a portion of the electrode assembly side surface.

3. The cell according to claim 1, wherein at least part of the groove has a V-shape.

4. The cell according to claim 1, wherein at least part of the groove has an arc-shaped.

5. The cell according to claim 1, wherein the portion of the lead between the electrode assembly side surface and the container side wall has edges that do not point inward toward the electrode assembly side surface.

6. The cell according to claim 1, wherein the electrode strips and separator strips are in a spirally wound configuration.

7. An electrochemical battery cell comprising a housing, an electrode assembly and an electrolyte, wherein:

the electrode assembly comprises a negative electrode strip, a positive electrode strip and at least one separator strip disposed between the negative and positive electrodes;

the housing comprises a container having at least one side wall and a bottom wall;

the electrode assembly has an electrically nonconductive external side surface adjacent to the container side wall and a bottom adjacent to the container bottom wall;

one of the negative and positive electrodes is in electrical contact with the container side wall through an electrical lead extending from the electrode assembly, and at least a portion of the lead is disposed between the electrode assembly side surface and the container side wall;

the lead is in physical contact with the container side wall by pressure only; and the portion of the lead between the electrode assembly side surface and the container side wall comprises a deformed initially non-planar shape, having a single groove disposed parallel to a longitudinal axis of the electrode assembly and two groove edges, that is biased against an internal surface of the container side wall; and the maximum difference between the container inside diameter and the electrode assembly diameter is defined by one equation selected from the group consisting of:

$$2R \cdot (1 - \cos(W/(2R))) + \frac{ID - \sqrt{ID^2 - (2R\sin(W/(2R)))^2}}{2} + t, \quad \text{i)}$$

wherein the groove is arc-shaped, W is the width of the lead measured along a surface of the lead, t is the material thickness of the lead, R is the radius of an arc formed between two longitudinal edges of the lead, ID is the inside diameter of the container, and $(W/R) \leq \pi$; and $$\left(\frac{W}{2}\right) \cdot \sin\left(\frac{180 - \theta}{2}\right) + \left(\frac{ID - \sqrt{ID^2 - (W^2/2) \cdot (1 - \cos\theta)}}{2}\right) + t, \quad \text{ii)}$$

wherein the groove is V-shaped, W is the width of the lead measured along a surface of the lead, t is the material thickness of the lead, θ is an angle between 0 and 180 degrees defined by two longitudinal edges of the lead, and ID is the inside diameter of the can.

8. The cell according to claim 7, wherein the electrode assembly further comprises a strip of electrically insulating material covering at least a portion of the electrode assembly side surface.

9. The cell according to claim 7, wherein a plurality of positive electrode strips, a plurality of negative electrode strips and separator strips are in a stacked configuration.

10. The cell according to claim 7, wherein the electrode strips and separator strips are in a folded configuration.

11. The cell according to claim 7, wherein the cell is a prismatic cell.

12. The cell according to claim 7, wherein the electrode assembly is non-cylindrical.

* * * * *

UNITED STATES PATENT AND TRADEMARK OFFICE
CERTIFICATE OF CORRECTION

PATENT NO. : 7,618,742 B2  Page 1 of 1
APPLICATION NO. : 11/045900
DATED : November 17, 2009
INVENTOR(S) : Kaplin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this

Fourteenth Day of December, 2010

David J. Kappos
*Director of the United States Patent and Trademark Office*